(12) United States Patent
Gasworth et al.

(10) Patent No.: US 6,797,384 B2
(45) Date of Patent: Sep. 28, 2004

(54) POLYCARBONATE AUTOMOTIVE WINDOW PANELS WITH COATING SYSTEM BLOCKING UV AND IR RADIATION AND PROVIDING ABRASION RESISTANT SURFACE

(75) Inventors: Steven M. Gasworth, Farmington Hills, MI (US); Mark Peters, Charleston, SC (US); Ralf Dujardin, Willich (DE)

(73) Assignee: Exatec, LLC., Wixom, MI (US)

( * ) Notice: Subject to any disclaimer, the term of this patent is extended or adjusted under 35 U.S.C. 154(b) by 211 days.

(21) Appl. No.: 10/236,868

(22) Filed: Sep. 6, 2002

(65) Prior Publication Data

US 2003/0072946 A1 Apr. 17, 2003

Related U.S. Application Data

(63) Continuation-in-part of application No. PCT/EP02/00001, filed on Mar. 16, 2001.
(60) Provisional application No. 60/317,599, filed on Sep. 6, 2001.

(51) Int. Cl.[7] .................................................. B32B 17/06
(52) U.S. Cl. ...................... 428/412; 428/500; 528/196; 528/198
(58) Field of Search ................................ 428/412, 500; 528/196, 198

(56) References Cited

U.S. PATENT DOCUMENTS

2003/0111160 A1 * 6/2003 Bolognese et al. ......... 156/100
2004/0048023 A1 * 3/2004 Clieve ....................... 428/40.1

* cited by examiner

Primary Examiner—Terressa Boykin
(74) Attorney, Agent, or Firm—Brinks Hofer Gilson & Lione

(57) ABSTRACT

An automotive glazing panel is provided by a polycarbonate substrate having a coating system including an inner layer blocking IR and overlying coating material blocking UV radiation and providing a scratch resistant outer coating layer.

14 Claims, 1 Drawing Sheet

POLYCARBONATE AUTOMOTIVE WINDOW PANELS WITH COATING SYSTEM BLOCKING UV AND IR RADIATION AND PROVIDING ABRASION RESISTANT SURFACE

CROSS REFERENCE TO RELATED APPLICATIONS

This application claims the benefit of provisional application Ser. No. 60/317,599 filed on Sep. 6, 2001.

This application is a continuation-in-part of PCT/EP02/00001 filed on Mar. 16, 2001, designating the United States, published on Sep. 27, 2001 as number. WO 02/053630A.

INCORPORATION BY REFERENCE

The parent application of PCT/EP02/00001 published on Sep. 27, 2001 is here incorporated by reference in its entirety.

Reference is made to U.S. Pat. Nos. 5,298,587; 5,320,875; 5,433,786; 5,494,712; 5,718,967; 5,900,284; 6,376,064; 6,432,494 and 6,397,776 which set forth details of coating compositions and processes discussed below which patents are hereby each incorporated by reference in their entirety.

BACKGROUND OF THE INVENTION

This invention concerns polymeric glazing panels for use in automotive windows and more particularly constructs comprised of coating systems in combination with polycarbonate automotive glazing panels.

The safety, styling and other advantages to be gained by polymeric glazing panels for automotive windows have long been appreciated. Polycarbonate has emerged as a desirable material for molding these panels due to its superior strength and optical clarity.

Use of polymeric based glazing materials in automotive applications has raised certain problems. This is due, as least in part, to the unique challenges posed by automotive service conditions. While not an exhaustive list, these include, but are not limited to at least one of the following: extremes of temperature and environmental exposure; intense and prolonged vibrational forces transmitted through the glazing material during normal operation of the automotive vehicle; occasional instances of intense shock and impact loads which may be randomly exerted on the glazing material scratching of the surface by incidental contacts such as in washing of the vehicle or the impacting of dust and other particles; and routine though prolonged exposure to debilitating environmental factors such as rain and the ultraviolet and infrared radiation in sunlight.

Another problem encountered in the use of polycarbonate in automotive glazing applications is the need to reduce the excessive heat load caused by penetration of solar radiation through the windows into the automobile interior, creating undesirable heat loads, particularly during summer months. While a similar problem has been encountered with silica based glass compositions in automotive glazing applications, the heat load problem can be addressed with the use of inorganic glass coatings or additives which can be integrated during glass formation or in suitable post formation steps. Heretofore, methods and strategies for reducing the heat load potential for polycarbonate based glazing compositions suitable for use in automotive applications has been more problematic.

It has long been recognized that the abrasion resistance of polycarbonate panel exposed surfaces needs to be greatly improved to be adequate for the severe automotive service requirements in this regard.

Various coatings have been devised to achieve such suitable abrasion resistance.

The leading candidate for improving abrasion resistance of polycarbonate is various plasma polymerized organosilicon coatings. Dip coatings are also available to improve abrasion resistance but generally these have not been found to be as effective for automotive glazing use.

Another consideration is the need to protect the polycarbonate from UV exposure to prevent the yellowing of this material which normally results.

It is the object of the present invention to provide a durable coating system on an automotive glazing panel able to meet all of the above requirements.

SUMMARY OF THE INVENTION

The present invention is directed to a polymeric glazing construction suitable for use in an automotive vehicle. The glazing construction includes a polycarbonate substrate having an outer surface; a polymeric innermost coating affixed to the exposed outer surfaces of the polycarbonate substrate, the polymeric coating capable of blocking transmission of at least a substantial portion of infrared radiation transmitted thereto; an intermediate coating over the innermost layer capable of blocking at least a substantial portion of UV radiation transmitted thereto to protect both the first coating and the polycarbonate; and an outer coating in overlying relationship with the intermediate UV infrared absorbing coating, the outermost coating composed of a material capable of resisting abrasion by exposure external to the polymeric glazing construction.

The above object as well as other objects which will be understood upon a reading of the following specification and claims are achieved by a polycarbonate window panel coated with an innermost layer of BAYTRON P which is a material available from Bayer A. G. of Leverkusen, Germany, and described in PCT/EP02/00001, which when applied to the polycarbonate functions as an infrared radiation blocker, a second overlying coating layer comprised of an UV radiation blocker, and an outermost coating layer providing an abrasion resistance by being sufficiently hard to be suitable for automotive service. Suitable primer coatings may also be applied between and/or under these coatings.

DESCRIPTION OF THE PREFERRED EMBODIMENT

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

The present invention is predicated upon the unexpected discovery that specific compositions can be successfully imparted in overlying relationship to a polycarbonate substrate in a manner which provides sufficient durability and utility for integration of the resulting glazing construct into a various components of an automotive vehicle.

As used herein, the term "automotive vehicle" is defined as any of a number of types of vehicles powered by a self contained or remote power plant which can be taken to include but are not limited to at least one of passenger cars, vans and motorcycles, light trucks, heavy duty trucks including off road vehicles, recreational vehicles such as mobile homes and campers, mass transit vehicles such as busses, locomotive vehicles such as trains and other light rail vehicles such as monorails and the like, as well as marine and air craft.

Figure 1:
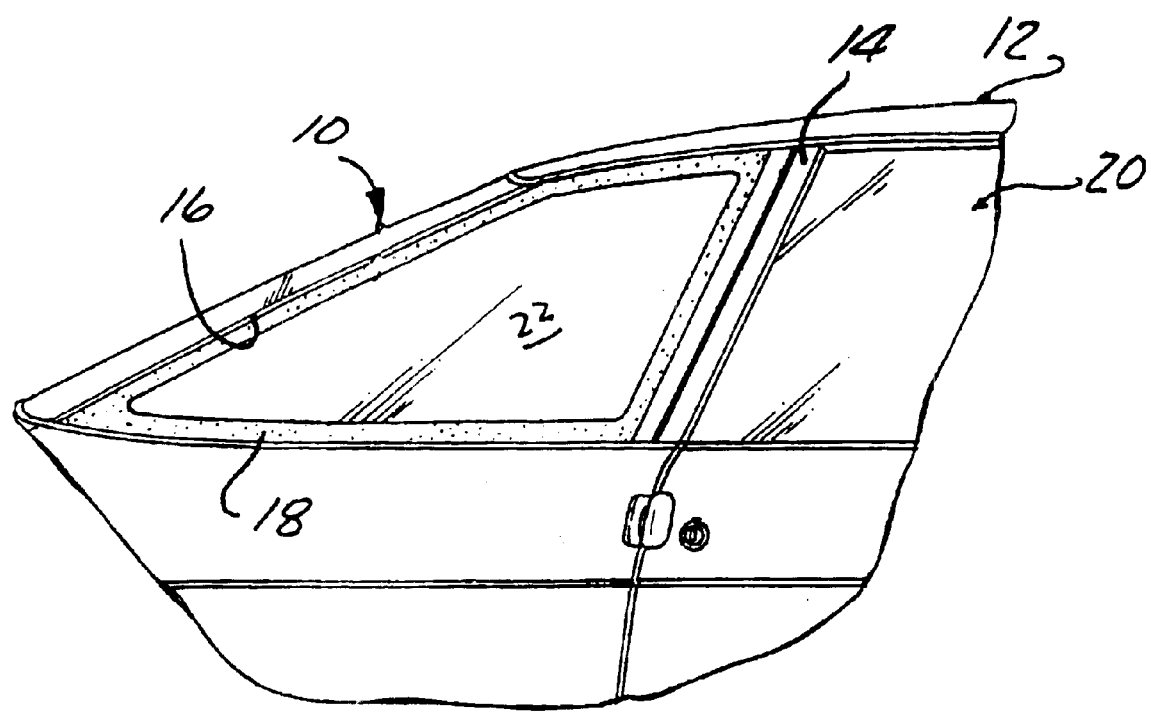
FIG. 1 is a fragmentary view of an automotive vehicle equipped with coated polycarbonate glazing panels.

Referring to the drawings, FIG. 1 shows a fragmentary portion of a passenger car 10 including a body 12 having portions 14, 16 defining a rear quarter window opening in which a glazing panel 22 is fixed in conventional fashion, such as with an adhesive bonding. A masking border 18 is typically provided as described in U.S. Pat. No. 6,309,755 to conceal the adhesive joint.

A drop glazing panel 20 is also typically included and could also be coated in the manner of the present invention.

Figure 2:
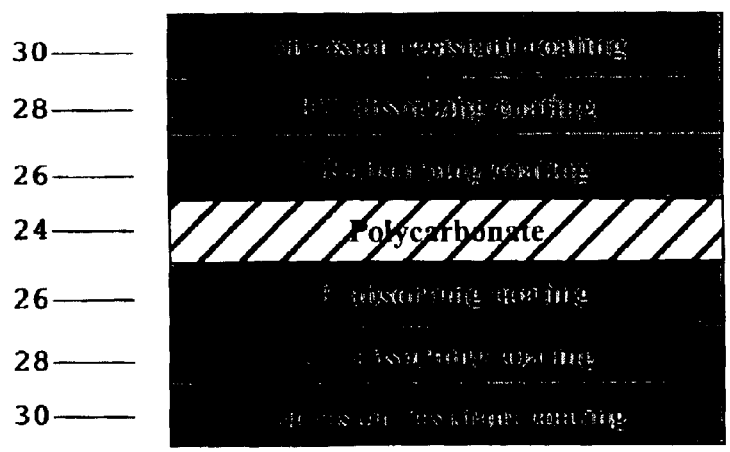
FIG. 2 is a diagrammatic depiction of the coating system and automotive glazing panel substrate according to the invention.

FIG. 2 is a diagrammatic representation of a section through the glazing panel 22, which may be typical of all of the glazing panels incorporated in the vehicle 10.

The glazing panel 22 comprises a polycarbonate substrate 24 having at least one outwardly facing surface having first innermost polymeric layers 26 bonded thereto. Polycarbonate substrate 24 may have a configuration appropriate for the window opening.

Suitable polycarbonate materials include, but are not limited to materials such as those well known in the art.

These polycarbonate resins are aromatic carbonate polymers which may be prepared by reacting one or more dihydric phenols with a carbonate precursor such as phosgene, a haloformate or a carbonate ester. One example of a polycarbonate which can be used is polycarbonate LEXAN, manufactured by the General Electric Company.

The first or innermost polymeric layer 26 contains a material which is capable of blocking the transfer of a substantial portion of transmitted infrared light through the first or innermost layer and into contact with the polycarbonate substrate while maintaining characteristic transparency of the polycarbonate substrate. Blocking of IR radiation transmission prevents at least a substantial portion of transmitted sunlight in the IR spectrum to penetrate the panel 22. It also includes the deflection of light in the IR spectrum away from the polycarbonate layer to reduce heat load in the passenger compartment. The degree of IR light blockage is a function of attributes such as material composition, layer thickness and the like.

The first or innermost coating layer 26 is of a material such as at least one from the group which includes substituted polythiophene styrene sulfonate, polypyrrole styrene sulfonate and substituted polypyrrole styrene sulfonate. Suitable materials also include 3, 4-dialkoxy substituted polythiophene styrene sulfonates. Suitable materials are commercially available from Bayer AG under the trade name BAYTRON P.

Reference is made to PCT/EP02/00001 incorporated herein by reference above, for details of the composition of BAYTRON P and the process of forming a coating on a polycarbonate substrate using BAYTRON P.

BAYTRON P is an aqueous dispersion of polyethylenedioxythiophene (PEDT) doped with a polymeric acid salt (e.g., polystyrene sulfonate). As commercially available the material is supplied as a 1.3% solution in water (pH=1-2). It is primarily used to coat glass and plastic substrates for antistatic finishing but is also used as an electrostatic coating of non-conductive surfaces. Coatings of BAYTRON P are transparent to light blue in color. It has been found that they can provide nearly 100% absorption of light in the range of 900 to 2000 nm which includes a large fraction of the infrared range.

The first or innermost polymeric layer 26 may have any suitable thickness sufficient to provide the IR deflecting/ absorbing capacities within the range desired. Typically, the material is applied to the surface of the polycarbonate substrate by any suitable application method such as described in PCT/EP02/00001.

The polycarbonate must be shielded from the UV radiation in sunlight. By applying a second or intermediate coating 28 which blocks transmission of UV radiation over the innermost BAYTRON P coatings 26, the polycarbonate substrate 24 is shielded as required. However, in addition, the BAYTRON P is also at the same time shielded from UV radiation. This is critical since BAYTRON P while having been applied to polycarbonate substrates, has been found to suffer from poor UV and thermal stability when used alone. However, when protected by a UV blocking layer 28, BAYTRON P has shown remarkable stability.

U.S. Pat. No. 6,376,064 incorporated by reference herein, describes a UV blocking coating applied over a polycarbonate substrate effective to shield polycarbonate, and is suitable to be applied over BAYTRON P.

That coating is comprised of a particular diorganodiorgonoxiysilane or a particular organotriorganoxysilane or both as described in detail therein.

The final or outermost coating 30 overlying the UV blocking coatings 28 comprise an abrasion resistant coating which is sufficiently hard and durable when exposed to weathering to be acceptable for automotive service.

Such coatings may be of the type comprised of a plasma polymerized and oxidized organosilicon material. Various forms of such coatings are described in the U.S. patents incorporated by reference, although the antiabrasion coating and processes described in U.S. Pat. Nos. 6,376,064; 6,432, 494; and 6,397,776 yield a coating having good weatherability characteristics and being sufficiently resistant to abrasion, and importantly being adaptable to the production rates necessary for economic viability for use in the auto industry.

Non plasma generated abrasion resistant coatings have also been developed, including by Bayer AG such as under Bayer designation number LP065. PCT/EP02/00001 also describes such a scratch resistant coating material which can be applied by conventional dip or flow technologies.

This three component coating system applied to a polycarbonate substrate provides ultraviolet (UV) protection for both the polycarbonate and BAYTRON P, provides a barrier to infrared (IR) radiation and provides adequate scratch resistance for automotive use. This three component coating system is stable in service for the automotive application.

The use of materials such as substituted polythiophene styrene sulfonates produces a significant reduction in the amount of solar radiation measured as total Solar Energy Transmission (TSET) that would normally penetrate a polycarbonate window.

Primers may be required for some of these coating layers and UV and BAYTRON P may in some instances be combined with an interposed primer coating. HYCAR (GE Trademark) has been found to be compatible with BAYTRON P.

The UV blocking layer could be combined with the outermost abrasion layer to combine the two outer layers to a single layer of overlying coating material rather than two layers of overlying coating material. Improved versions of plasma polymerized and oxidized organosilicon abrasion resistant coatings are typically in development and may be used, and the same is true for the wet coat abrasion resistant materials.

EXAMPLE I

A BAYTRON P coating was applied to a polycarbonate panel to reduce the transparency of polycarbonate to the infrared range of solar radiation. This coating was then coated with a sol-gel coating containing UV absorbers to at least partially block the ultraviolet range of solar radiation. To reach the required level of abrasion resistance for an automotive glazing application, this coating system was further improved by deposition of a plasma enhanced chemically vapor deposited (PECVD) silicon based layer. This coating system provided ultraviolet (UV) protection, a barrier to infrared (IR) radiation, and also provided superior scratch resistance (delta haze of <2.0% after Taber abrasion using a CS10F wheel, 500 g of load, and 1000 cycles).

Dip Coating with CPP105 (BAYTRON P)
800 g of coating material
65% CPP105=520 g
35% HYCAR=280 g
dip rate: in 50 cm/min. out 50 cm/min.
dwell time: 5 secs.
flash off: 15 mins.
HYCAR Primer was top coated with GE AS4004 (UV blocker) by dip coated with same parameters listed above and then cured @130° C. for 1 h.
% Transmission measured after AS4004 top coat was applied: 76.8%
ΔHaze=0.76% after TABER

What is claimed is:

1. A glazing construction for use in an automotive vehicle comprising:
   a polycarbonate substrate having at least one outwardly facing surface, the polycarbonate substrate having optical transparency;
   an inner layer connected thereto including BAYTRON P material capable of reducing the amount of infrared radiation which penetrates to the polycarbonate substrate without unduly compromising optical transparency of the polycarbonate substrate; and coating material overlying said inner polymeric layer blocking transmission of UV radiation to said inner layer and substrate; and
   also imparting scratch resistance to the outwardly facing surface of the associated glazing construction without unduly compromising optical transparency of the polycarbonate substrate.

2. The glazing construction of claim 1 wherein the BAYTRON P material included in the inner layer is at least one of substituted polythiophene styrene sulfonate, polypyrrole styrene sulfonate and substituted polypyrrole styrene sulfonate.

3. The glazing construction of claim 1 wherein the BAYTRON P material included in the inner layer is derived from an aqueous dispersion of polyethylenedioxythiophene (PEDT) doped with a polymeric acid salt.

4. The glazing construction of claim 1 wherein the inner layer can provide nearly 100% absorption of light in the range of 900 to 2000 nm.

5. The glazing construction of claim 1 wherein said overlying material includes an outermost layer comprising a plasma polymerized and oxidized organosilicon material.

6. An automotive window subassembly including a glazing panel, the glazing panel including:
   a polycarbonate substrate having at least one outwardly facing surface, the polycarbonate substrate having optical transparency;
   a first layer connected thereto, the first polymeric layer including BAYTRON P material capable of reducing the amount of infrared radiation which penetrates to the polycarbonate substrate with out unduly compromising optical transparency of the polycarbonate substrate;
   an overlaying of coating material above said first layer which blocks ultraviolet radiation transmission to the first layer and substrate without unduly compromising optical transparency of the polycarbonate and, which also imparts scratch resistance to said outer surface of said glazing panel.

7. The automotive window subassembly of claim 6 wherein said first layer on the polycarbonate substrate comprises at least one of substituted polythiophene styrene sulfonate, polypyrrole styrene sulfonate and substituted polypyrrole styrene sulfonate.

8. The automotive window subassembly of claim 6 wherein the BAYTRON P material included in said first layer is derived from an aqueous dispersion of polyethylenedioxythiophene (PEDT) doped with a polymeric acid salt.

9. The automotive window subassembly of claim 6 wherein the first layer can provide nearly 100% absorption of light in the range of 900 to 2000 nm.

10. The automotive window subassembly of claim 6 wherein said overlying material includes an outermost layer comprised of a plasma polymerized and oxidized organosilicon material.

11. An automotive vehicle having at least one window including a glazing panel which comprises:
   a polycarbonate substrate having at least one outwardly facing surface, the polycarbonate substrate having optical transparency;
   a first layer connected thereto, the first polymeric layer including BAYTRON P capable of reducing the amount of infrared radiation which penetrates to the polycarbonate substrate without unduly compromising optical transparency of the polycarbonate substrate;
   a second layer connected in overlying relationship to the first layer, the second polymeric layer including a material which blocks transmission of ultraviolet radiation to the substrate and first layer without unduly compromising optical transparency of the polycarbonate; and
   a third outermost layer imparting scratch resistance to said glazing panel.

12. The automotive vehicle of claim 11 wherein said third outermost layer is composed of a plasma polymerized and oxidized organosilicon material.

13. The automotive vehicle of claim 11 which the window is a fixed panel and includes at least one structural support associated therewith.

14. The automotive vehicle of claim 11 wherein said third outermost layer is capable of being applied as a wet coating.

* * * * *